US012751372B2

(12) United States Patent
Isaac

(10) Patent No.: US 12,751,372 B2
(45) Date of Patent: Oct. 6, 2026

(54) VARIABLE SPEED DRIVE FOR CHAFF MILL OF COMBINE HARVESTER

(71) Applicant: CNH Industrial America LLC, New Holland, PA (US)

(72) Inventor: Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 336 days.

(21) Appl. No.: 18/417,467

(22) Filed: Jan. 19, 2024

(65) Prior Publication Data

US 2025/0234810 A1 Jul. 24, 2025

(51) Int. Cl.

| | |
|---|---|
| ***A01F 12/40*** | (2006.01) |
| ***A01D 41/12*** | (2006.01) |
| ***A01D 69/00*** | (2006.01) |
| ***A01D 69/06*** | (2006.01) |
| *A01D 69/03* | (2006.01) |
| *A01F 12/30* | (2006.01) |

(52) U.S. Cl.
CPC ............ *A01F 12/40* (2013.01); *A01D 69/002* (2013.01); *A01D 69/06* (2013.01); *A01D 69/03* (2013.01); *A01F 12/30* (2013.01)

(58) Field of Classification Search
CPC .. A01D 69/002; A01D 69/06; A01D 41/1243; A01F 12/40
See application file for complete search history.

(56) References Cited

U.S. PATENT DOCUMENTS 4,854,919 A 8/1989 van Lith
6,086,499 A 7/2000 Brandsma
7,214,159 B2 5/2007 Miller et al.
7,941,998 B2 5/2011 Nakano et al.
10,004,176 B2 6/2018 Mayerle
10,314,232 B2 6/2019 Isaac et al.
10,492,369 B2 12/2019 Mayerle
11,013,182 B2 * 5/2021 Mayerle ............ A01D 41/1243
(Continued)

FOREIGN PATENT DOCUMENTS

AU 2019202177 A1 10/2019
EP 3017682 B1 3/2019
(Continued)

OTHER PUBLICATIONS

The Extended European Search Report issued Jul. 3, 2025, by the European Patent Office in corresponding European Patent Application No. 25152544.0. (9 pages).

*Primary Examiner* — Adam J Behrens
(74) *Attorney, Agent, or Firm* — Buchanan Ingersoll & Rooney PC

(57) ABSTRACT

A residue processing system for an agricultural harvester includes a chaff mill for processing a stream of chaff containing weed seeds, and a drive system for powering the chaff mill. The drive system includes a gearbox having (i) an input shaft that either directly or indirectly receives power from an engine or other power source of the agricultural harvester, and (ii) an output shaft that is either directly or indirectly connected to a rotor of the chaff mill for rotating the rotor. The gearbox is configured to selectively rotate the output shaft at at least two different speeds such that the rotor of the chaff mill can be rotated at at least two different speeds.

17 Claims, 3 Drawing Sheets

(56) References Cited

U.S. PATENT DOCUMENTS

| | | | | |
|---|---|---|---|---|
| 11,178,817 | B2 | 11/2021 | Mayerle | |
| 2002/0077163 | A1* | 6/2002 | Buermann | A01F 12/40 460/112 |
| 2014/0298766 | A1* | 10/2014 | Furmaniak | A01D 69/002 56/14.6 |
| 2015/0373913 | A1* | 12/2015 | Berry | A01F 12/00 460/149 |
| 2016/0044870 | A1* | 2/2016 | Mayerle | A01F 12/40 460/112 |
| 2017/0238463 | A1* | 8/2017 | Van de Wege | A01F 12/40 |
| 2018/0368318 | A1* | 12/2018 | Isaac | B02C 4/38 |
| 2019/0283034 | A1* | 9/2019 | Berry | B02C 13/00 |
| 2020/0128732 | A1* | 4/2020 | Chaney | A01M 21/02 |
| 2021/0022289 | A1* | 1/2021 | Berry | A01D 41/1271 |
| 2021/0274710 | A1 | 9/2021 | Todderud et al. | |
| 2022/0046862 | A1* | 2/2022 | Mayerle | A01F 29/14 |
| 2022/0287236 | A1* | 9/2022 | Berry | A01D 75/187 |
| 2022/0361411 | A1* | 11/2022 | Mayerle | A01D 41/1243 |
| 2023/0053959 | A1* | 2/2023 | Berry | B02C 13/2804 |
| 2023/0059955 | A1* | 2/2023 | Mayerle | F16G 5/20 |
| 2023/0086794 | A1 | 3/2023 | Van De Wege et al. | |
| 2023/0141301 | A1* | 5/2023 | Mayerle | A01F 12/40 56/10.8 |
| 2024/0114840 | A1* | 4/2024 | Berry | B02C 13/284 |

FOREIGN PATENT DOCUMENTS

| | | | |
|---|---|---|---|
| EP | 3646699 | A1 | 5/2020 |
| WO | 2023049326 | A1 | 3/2023 |

* cited by examiner

VARIABLE SPEED DRIVE FOR CHAFF MILL OF COMBINE HARVESTER

FIELD OF THE INVENTION

The present invention relates to agricultural harvesters. More specifically, the present invention relates to a drive system for a mill (e.g., chaff mill or weed seed mill) for a combine harvester.

BACKGROUND OF THE INVENTION

As is described in U.S. Pat. No. 10,314,232 to CNH America LLC (the '232 patent), which is incorporated by reference in its entirety and for all purposes, an agricultural harvester known as a "combine" is historically termed such because it combines multiple harvesting functions with a single harvesting unit, such as picking, threshing, separating and cleaning. The separating system of the combine directs the non-grain material to a residue system. The residue system distributes the non-grain material through a chopper, a spreader, and/or a windrow chute before it is distributed onto the field.

Crop residue that is discharged onto fields often contains lost grain and seeds, including shrunken crop seeds and weed seeds. Most or all of the seeds are in the chaff that exits the cleaning system. Many of the seeds are not destroyed and remain viable after exiting the combine. Viable seeds can germinate and sprout in the field, resulting in the spread of undesired weeds and potential crop disease. Weeds that sprout are typically killed by tillage or chemical treatment, however, weed control measures such as these are costly. Moreover, these weed control measures require additional equipment passing over the field, which can increase soil compaction and adversely impact the condition of the field.

The '232 patent discloses a weed seed mill positioned for destroying the weed seeds through shearing or impact forces. A weed seed mill may also be referred to herein or in the art as a seed processor, chaff mill, chaff mill assembly, or chaff processor. The seed mill is configured to receive crop residue from a cleaning system of the combine and destroy or damage seeds through a combination of shearing and impact forces, so that when the seeds exit the combine, the seeds are no longer viable and able to germinate. The weed seed mill may be powered by a drive system including a shaft mounted pulley that is driven by a belt that is indirectly connected to the engine of the combine (for example).

Weed seed mills are typically rotated as a single constant speed by a drive system. Such weed seed mill drive systems consume power at all times, even when the mill is processing a minimal amount of chaff, which may result in premature wear of the mill, draw unnecessary power from the engine of the combine, and may generally be perceived as inefficient.

In view of the foregoing, it would be desirable to operate the weed seed mill with at least two different speeds (e.g., a high speed and a low speed), for example, to maintain performance of the mill while resolving the aforementioned wear, power and efficiency concerns.

SUMMARY OF THE INVENTION

According to one aspect of the invention, a residue processing system for an agricultural harvester includes a chaff mill for processing a stream of chaff containing weed seeds, and a drive system for powering the chaff mill. The drive system includes a gearbox having (i) an input shaft that either directly or indirectly receives power from an engine or other power source of the agricultural harvester, and (ii) an output shaft that is either directly or indirectly connected to a rotor of the chaff mill for rotating the rotor. The gearbox is configured to selectively rotate the output shaft at at least two different speeds such that the rotor of the chaff mill can be rotated at at least two different speeds.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
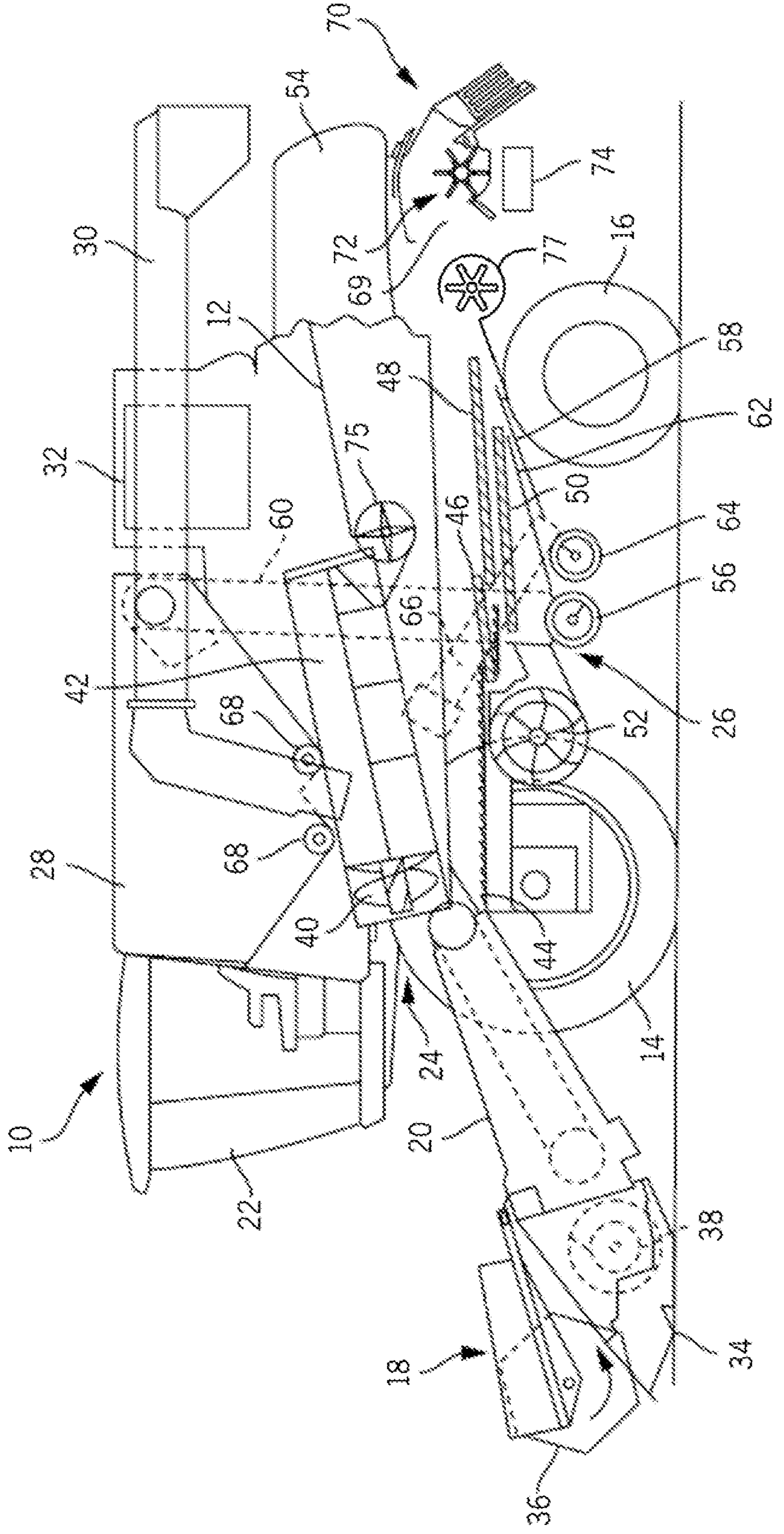
FIG. 1 is a side view of an embodiment of an agricultural harvester in the form of a combine illustrating the residue handling system of the present invention in a cutout view toward the rear of the harvester.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "chaff", "straw", and "tailings" are used principally throughout this specification for convenience but it is to be understood that these terms are not intended to be limiting. Thus "grain" refers to that part of the crop material that is threshed and separated from the discardable part of the crop material, which is referred to as chaff and includes straw, seeds, and other non-grain crop material.

Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow stream.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Motive force is selectively applied to the front wheels 14 through a power plant in the form of an engine 32 and a transmission (not shown). Both the front and rear wheels 14 and 16 may be steerable.

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24.

The threshing and separating system 24 generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

Although a rotary combine has been described thus far, it should be understood that the details presented herein are not limited to a rotary combine and may be applicable to other machines, such as conventional combines and cross (or hybrid) combines.

A residue handling system 70 is integrated in the rear of harvester 10. Residue handling system 70 generally comprises a straw hood 54, a discharge beater 75, one or more seed mills 77, a chopper 72, and one or more spreaders 74.

Referring now to the individual components of residue handling system 70, straw hood 54 defines an interior space, which is referred to herein as a passageway 69 for straw and chaff. Discharge beater 75 is configured to deliver a stream of straw material into the upper end of passageway 69 towards chopper 72. Chopper 72 is configured to rotate and chop the straw material and deliver it to spreader 74. The spreader 74 discharges the non-grain crop material across the harvested width behind harvester 10. Further details of discharge beater 75, chopper 72 and spreader 74 are provided in the '232 patent. It is noted that chopper 72 may be omitted, if so desired. For example, if beater 75 has two speed settings (e.g., high and low), there may not be a need to include a separate chopper 72 because the beater 75 can act as a chopper when it is operated at the high-speed setting.

At the same time that beater 75 delivers a stream of straw material to chopper 72, the cleaning system 26 delivers a stream of chaff material along the lower end of passageway 69 (by way of reciprocating sieve 48) and into seed mill 77. The chaff material may include weed seeds. Seed mill 77 includes a rotor and a stator that are together configured to devitalize weed seeds contained in the chaff to prevent germination of those seeds when they are distributed back onto the field. Seed mill 77 ultimately expels the processed chaff either directly onto the field or into the spreader 74 which, in turn, expels the chaff onto the field. Further details in connection with seed mill 77 are described in U.S. Pat. No. 10,004,176 and U.S. Patent App. Pub. No. 20230086794, which are each incorporated by reference in their entirety.

Figure 2:
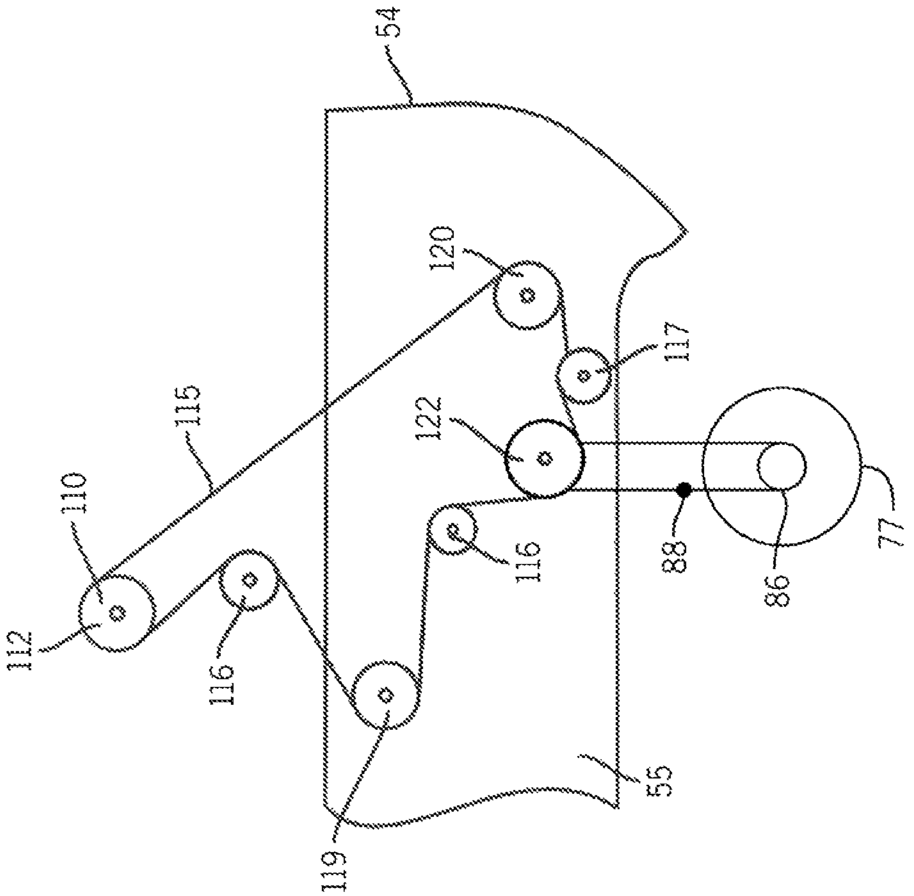
FIG. 2 is a schematic view of a drive system for driving a weed seed mill of the residue handling system of the combine of FIG. 1.

Turning now to FIG. 2, those figures show a drive system that delivers power from the power take off (PTO) shaft of the combine to the chopper 72, seed mill 77 and other elements of the combine using a belt 115. More particularly, a PTO shaft 110 on the combine is connected to receive power from the engine 32 of the combine. A pulley 112 is positioned at the end of the shaft 110. The belt 115 is wound around the pulley 112. The belt 115 is also wound about a pulley 119 that is connected to a shaft of beater 75. The belt 115 is further wound about a chopper pulley 120 for rotating the pulley 120. A shaft extending from the pulley 120 is connected to the chopper 72 for rotating the chopper 72. Idler pulleys 116 and 117 bear on belt 115 to impart tension to the belt 115 and remove any slack in the belt 115.

Figure 3A:
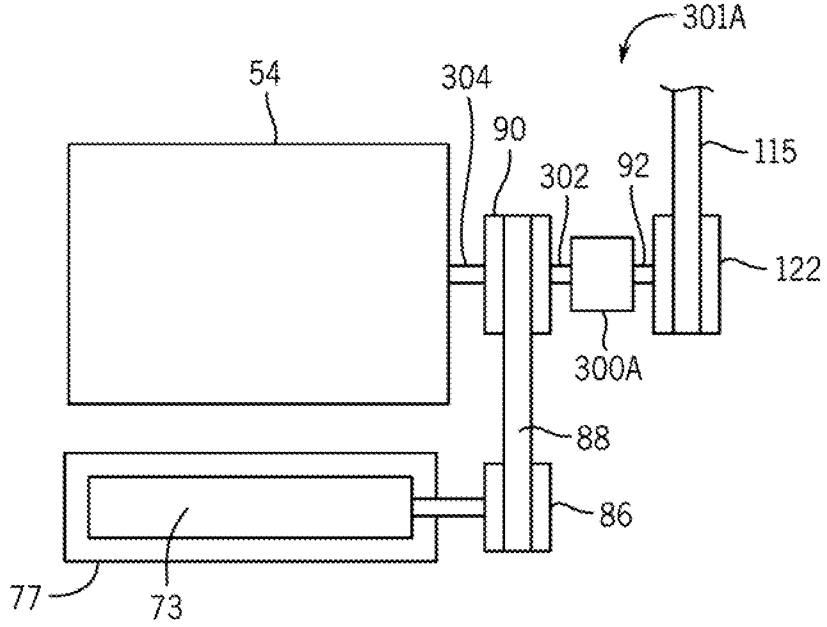
FIG. 3A depicts a schematic view, as taken from a rear end of the combine, showing further details of the drive system of FIG. 2.
Figure 3B:
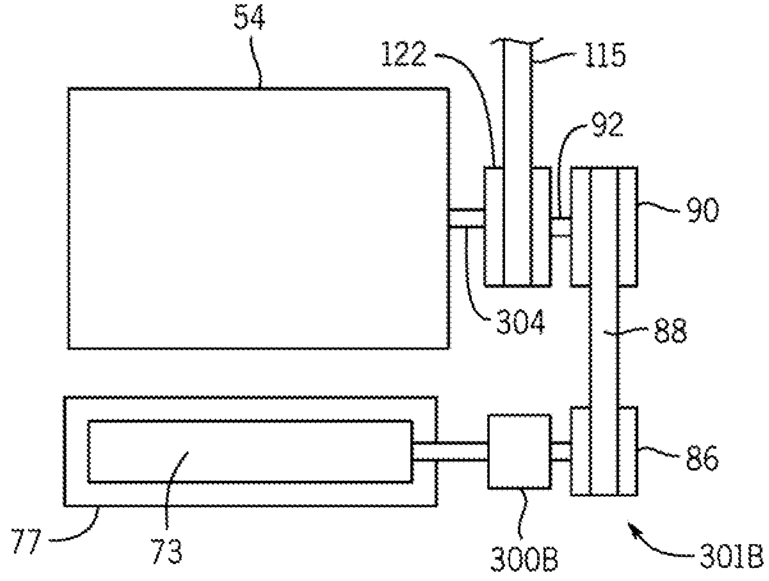
FIG. 3B depicts another schematic view like that shown in FIG. 3A with the exception that FIG. 3B depicts an alternative location for a gearbox of the drive system.

The belt 115 is also wound around a jackshaft pulley 122 for rotating that pulley 122. As will be described in greater detail with respect to FIGS. 3A and 3B, the jackshaft pulley 122 is indirectly connected to the seed mill 77 for driving the seed mill 77. FIGS. 3A and 3B provide different alternatives for transferring power from jackshaft pulley 122 to seed mill 77.

Before reaching FIGS. 3A and 3B, it is noted that the number and position of the above-mentioned pulleys as well as the trajectory of belt 115 may vary from that which is shown and described. It is also noted that the belt 115 does not have to be wound about pulley 119 and/or pulley 120 depending upon the configuration of the combine. It is further noted that the position of the idler pulleys 116 and 117 can vary, and the number of idler pulleys can vary.

Turning now to FIG. 3A, and according to one exemplary embodiment, that figure shows a drive system 301A for powering the mill 77. The drive system 301A includes a belt 115 that is wrapped around jackshaft pulley 122 for rotating that pulley 122. The shaft 92 extending from pulley 122 is connected to an input of a gearbox 300A. The output 302 of the gearbox 300A is connected to pulley 90 for rotating that pulley 90 about a shaft 304. Shaft 304 may be stationary. Belt 88 is wound about pulley 90 as well as pulley 86 for transferring power from pulley 90 to pulley 86. The output shaft of pulley 86 is connected to the input shaft of rotor 73 for rotating rotor 73. Drive system 301A may be said to include pulleys 122, 90 and 86, as well as belts 115 and 88, as well as gearbox 300A.

The gearbox 300A may be a two-speed gearbox, for example. The gearbox 300A may comprise a first gear having a first drive ratio and a second gear having a second drive ratio that differs from the first drive ratio for driving the rotor 73 of the seed mill 77 (via the pulleys 86 and 90 and belt 88) at two different speeds.

Gearbox 300A is shown schematically and may differ from that shown and described. For example, gearbox 300A may represent a planetary gear, a variable-diameter pulley continuously variable transmission, a push-belt continuously variable transmission, a planetary continuously variable transmission, a hydrostatic continuously variable transmission, or an infinitely variable transmission. By way of example, U.S. Pat. No. 6,086,499 discloses a push-belt continuously variable transmission. U.S. Pat. No. 7,214,159 discloses a planetary continuously variable transmission. U.S. Pat. No. 7,941,998 discloses a hydrostatic continuously variable transmission. U.S. Pat. No. 4,854,919 discloses an infinitely variable transmission. U.S. Patent App. Pub. No. 2021/0274710 discloses a planetary gear drive. Each of these references is incorporated by reference herein in its entirety.

Turning now to FIG. 3B, that figure shows an alternative drive system 301B for powering the mill 77. The drive system embodiment shown in FIG. 3B is substantially the same as that shown in FIG. 3A, with the exception that gearbox 300B is positioned at a different location. It should be understood that the details provided above with respect to gearbox 300A also apply to gearbox 300B with the exception of the position of the gearbox. In FIG. 3B, the output shaft of gearbox 300B is directly connected to the input shaft of rotor 73 of seed mill 77 for driving the rotor 73 at different speeds. It is noted that shaft 92 may be omitted if pulleys 90 and 122 are fixed together and/or form part of a double pulley. It is further noted that pulleys 90 and 122 may be said to be non-rotatable with respect to each other, i.e., they rotate together and at the same speed.

It should be understood that the embodiments shown in FIGS. 3A and 3B both provide a variable speed drive for rotor 73 of seed mill. The gearboxes 300A and 300B may be controlled either manually or automatically (via a controller) for driving the rotor 73 at different speeds.

By virtue of the gearboxes 300A and 300B (or other feature), the rotational speed of rotor 73 of seed mill may be controlled independently from the rotational speed of chopper 72. It is known that straw choppers are ordinarily operated at either high or low speeds, and the speed changes are made by moving the drive belt from one set of pulley ratio to another set, whereby the pulley sets are integrated together.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A residue processing system for an agricultural harvester, said residue processing system comprising:

a chaff mill for processing a stream of chaff containing weed seeds; and a drive system for powering the chaff mill, wherein the drive system comprises a belt-driven gearbox having (i) an input shaft that either directly or indirectly receives power from an engine or other power source of the agricultural harvester, and (ii) an output shaft that is either directly or indirectly connected to a rotor of the chaff mill for rotating the rotor, wherein the belt-driven gearbox is configured to selectively rotate the output shaft at at least two different constant speeds such that the rotor of the chaff mill can be rotated at at least two different constant speeds, wherein the gearbox has a first gear or gear set having a first drive ratio and a second gear or gear set having a second drive ratio that differs from the first drive ratio, wherein the chaff mill is a weed seed mill that is configured to devitalize the weed seeds in the stream of chaff, wherein the weed seed mill comprises the rotor and a stator surrounding the rotor, and the rotor is configured to rotate with respect to the stator for damaging and devitalizing the weed seeds passing between the rotor and stator.

2. The residue processing system of claim 1, wherein the gearbox is a planetary gear, a variable-diameter pulley continuously variable transmission, a push-belt continuously variable transmission, a planetary continuously variable transmission, a hydrostatic continuously variable transmission, or an infinitely variable transmission.

3. The residue processing system of claim 1, further comprising a first pulley (122) that receives power from the engine or other power source of the agricultural harvester, a second pulley (90) that is connected to the first pulley to receive power therefrom, and a third pulley (86) that is connected to the second pulley to receive power therefrom, wherein the third pulley either directly or indirectly delivers power to the rotor of the chaff mill.

4. The residue processing system of claim 3, wherein the second and third pulleys are interconnected by a belt.

5. The residue processing system of claim 3, wherein the input shaft of the gearbox is non-rotatably connected to the first pulley, and the output shaft of the gearbox is non-rotatably connected to the second pulley.

6. The residue processing system of claim 3, wherein the input shaft of the gearbox is non-rotatably and directly connected to the third pulley without a belt, and the output shaft of the gearbox is non-rotatably connected to the rotor of the chaff mill.

7. The residue processing system of claim 3, wherein the first pulley is driven by a belt that receives power from the engine or other power source of the agricultural harvester.

8. The residue processing system of claim 1, wherein the weed seed mill is configured to damage and devitalize the weed seeds passing between the rotor and stator through shearing forces.

9. The residue processing system of claim 1, wherein the input and output shaft of the belt-driven gearbox are coaligned along a single axis.

10. An agricultural harvester comprising the residue processing system of claim 1.

11. The agricultural harvester of claim 10, further comprising a straw hood having a hollow interior space for receiving material other than grain (MOG) from a threshing and separating system of the harvester and a separate stream of the chaff from a cleaning system of the harvester.

12. The agricultural harvester of claim 11, wherein the residue processing system further comprises a first pulley (122) that receives power from the engine or other power source of the agricultural harvester, a second pulley (90) that is connected to the first pulley to receive power therefrom, and a third pulley (86) that is connected to the second pulley to receive power therefrom, wherein the third pulley delivers power to the rotor of the chaff mill, wherein one of the first and second pulleys is driven by a first belt that receives power from the engine or the other power source of the agricultural harvester, and a second belt interconnects the third pulley with the other of the first and second pulleys.

13. The agricultural harvester of claim 12, further comprising a discharge beater that is configured to deliver the MOG into the hollow interior space, wherein the discharge beater is directly driven by the first belt.

14. The agricultural harvester of claim 13, further comprising a chopper for receiving the MOG from the discharge beater and chopping the MOG, wherein the chopper is directly driven by the first belt.

15. The agricultural harvester of claim 14, wherein the chaff mill is separate from the chopper and the discharge beater.

16. The agricultural harvester of claim 12, wherein the first pulley, the second pulley, the third pulley and the belt-driven gearbox are positioned outside of the strawhood.

17. The agricultural harvester of claim 16, wherein the first and second pulleys are mounted to a sidewall of the strawhood by a jackshaft.

* * * * *